United States Patent
Watanabe et al.

(10) Patent No.: US 11,691,679 B2
(45) Date of Patent: Jul. 4, 2023

(54) AIRFLOW ADJUSTING APPARATUS

(71) Applicant: SUBARU CORPORATION, Tokyo (JP)

(72) Inventors: Naoto Watanabe, Tokyo (JP); Yusaku Dogahira, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 0 days.

(21) Appl. No.: 17/347,095

(22) Filed: Jun. 14, 2021

(65) Prior Publication Data

US 2022/0033010 A1 Feb. 3, 2022

(30) Foreign Application Priority Data

Jul. 30, 2020 (JP) ................................ 2020-128750

(51) Int. Cl.
*B62D 35/02* (2006.01)
*B62D 35/00* (2006.01)

(52) U.S. Cl.
CPC ........... *B62D 35/02* (2013.01); *B62D 35/005* (2013.01)

(58) Field of Classification Search
CPC ....... B62D 35/00; B62D 35/005; B62D 35/02
USPC .......................................... 296/180.1, 180.2
See application file for complete search history.

(56) References Cited

U.S. PATENT DOCUMENTS

| | | | | |
|---|---|---|---|---|
| 4,180,290 | A * | 12/1979 | Drews .................... | B62D 35/00 244/130 |
| 4,511,170 | A * | 4/1985 | Sankrithi ............. | B62D 35/008 296/180.1 |
| 10,011,344 | B1 * | 7/2018 | Santavicca, Jr. .......... | B64C 1/38 |
| 2010/0072777 | A1 * | 3/2010 | Ramsay ................. | B62D 35/00 296/180.1 |
| 2012/0061993 | A1 | 3/2012 | Hasegawa et al. | |
| 2013/0026797 | A1 * | 1/2013 | Onodera ................ | B62D 35/02 296/204 |
| 2016/0068203 | A1 * | 3/2016 | Uchiyama .............. | B62D 35/02 296/180.1 |
| 2017/0057565 | A1 * | 3/2017 | Sarhadiangardabad ..................... | B62D 35/02 |
| 2017/0297634 | A1 * | 10/2017 | Han ....................... | B62D 35/00 |

(Continued)

FOREIGN PATENT DOCUMENTS

| | | | |
|---|---|---|---|
| DE | 102017200820 A1 * | 7/2018 | |
| DE | 102019004863 A1 * | 1/2020 | |

(Continued)

OTHER PUBLICATIONS

English translation of EP 1 477 394; retrieved via PatentTranslate located at www.epo.org. (Year: 2022).*

*Primary Examiner* — Jason S Daniels
(74) *Attorney, Agent, or Firm* — McGinn I.P. Law Group, PLLC.

(57) ABSTRACT

An airflow adjusting apparatus to be provided in a vehicle includes a flap and an airflow generator. The vehicle includes a wheel disposed to be partly protruded downward from a vehicle body of the vehicle. The flap is protruded, in front of the wheel, downward from the vehicle body. The airflow generator is provided in an underneath of the vehicle body and vehicle-widthwise inwardly from the wheel. The airflow generator is configured to generate an airflow vehicle-widthwise inward, and backward of the vehicle. The airflow moves obliquely relative to a vehicle longitudinal direction when the vehicle travels forward.

20 Claims, 4 Drawing Sheets

(56) References Cited

U.S. PATENT DOCUMENTS

| | | | | |
|---|---|---|---|---|
| 2019/0152543 A1* | 5/2019 | Shiga | ................... | B62D 37/02 |
| 2019/0342985 A1* | 11/2019 | Dadheech | ............ | H05H 1/2406 |
| 2021/0355923 A1* | 11/2021 | Niwa | ................... | B62D 35/00 |

FOREIGN PATENT DOCUMENTS

| | | | | | |
|---|---|---|---|---|---|
| DE | 102019115256 A1 | * | 6/2020 | ........... | B60R 16/023 |
| EP | 1477394 A1 | * | 11/2004 | ............. | B62D 35/00 |
| GB | 2530480 A | * | 3/2016 | ........... | B60B 39/026 |
| JP | 2012-056499 A | | 3/2012 | | |
| JP | 2019-111965 A | | 7/2019 | | |

\* cited by examiner

AIRFLOW ADJUSTING APPARATUS

CROSS-REFERENCE TO RELATED APPLICATIONS

This application claims priority from Japanese Patent Application No. 2020-128750 filed on Jul. 30, 2020, the entire contents of which are hereby incorporated by reference.

BACKGROUND

The disclosure relates to an airflow adjusting apparatus that adjusts airflows between an underneath of a vehicle body of a vehicle and a road surface.

For vehicles such as a four-wheeled automobile, airflows colliding with a wheel under a vehicle body disturb a flow field, causing aggravation of, for example, air resistance, aerodynamic noise, and aerodynamic vibration. This leads to a desire for suppression of disturbance of airflows around the wheel.

As an existing airflow adjusting technique around the wheel, for example, Japanese Unexamined Patent Application Publication (JP-A) No. 2012-56499 describes an airflow adjusting apparatus including a flap. The flap protrudes, in front of a wheel house, downward from a vehicle body. The flap suppresses a relative wind, or a so-called traveling wind, from colliding with the wheel, leading to reduction in an overall drag of a vehicle. A relative wind refers to an airflow that moves relative to the vehicle body in accompaniment with travel of the vehicle.

Moreover, in recent years, proposals have been made for airflow adjustment around the vehicle body with the use of a device that actively generates an airflow.

For example, JP-A No. 2019-111965 describes a windshield wiper that wipes a windshield of a vehicle. The windshield wiper includes a wiper arm provided with a plasma actuator that jets out an airflow.

SUMMARY

An aspect of the technology provides an airflow adjusting apparatus to be provided in a vehicle. The vehicle includes a wheel disposed to be partly protruded downward from a vehicle body of the vehicle. The airflow adjusting apparatus includes a flap and an airflow generator. The flap is protruded, in front of the wheel, downward from the vehicle body. The airflow generator is provided in an underneath of the vehicle body and vehicle-widthwise inwardly from the wheel. The airflow generator is configured to generate an airflow vehicle-widthwise inward, and backward of the vehicle. The airflow moves obliquely relative to a vehicle longitudinal direction when the vehicle travels forward.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the disclosure.

DETAILED DESCRIPTION

Figure 1:
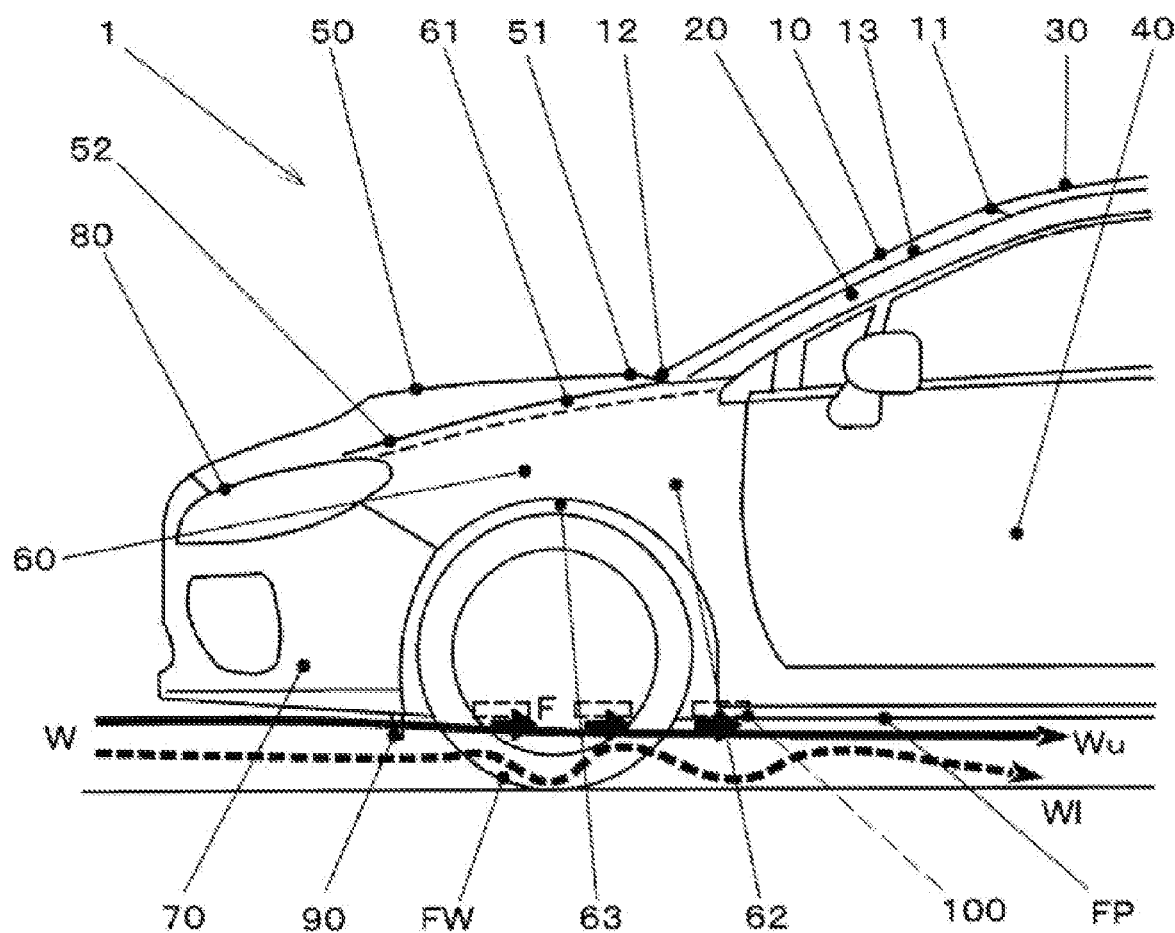
FIG. 1 is a schematic side view of a front portion of a vehicle body of a vehicle including an airflow adjusting apparatus according to a first embodiment of the disclosure.

In a case with a flap provided directly in front of a front wheel, an airflow collides with the flap, and separates itself to the right and left sides of the front wheel, avoiding the front wheel. Thus, the airflow moves backward of the vehicle, passing through the right and left sides of the front wheel, with relatively small turbulence and at a high flow rate.

In the meanwhile, under the flap, the airflow collides directly with the front wheel, to form a turbulent flow having relatively great turbulence, or vortex, and moves at a low flow rate, or moves slowly, under a floor of the vehicle.

The airflow having collided with the flap and the airflow having collided with the wheel under the flap join together, causing the airflow having collided with the flap to get caught in the airflow having collided with the wheel, to form a turbulent flow, with a decrease in the flow rate of the airflow having collided with the flap. This contributes to aggravation of air resistance, aerodynamic vibration, and aerodynamic noise.

It is desirable to provide an airflow adjusting apparatus that makes it possible to appropriately adjust airflows between an underneath of a vehicle body and a road surface.

First Embodiment

Some embodiments of the disclosure are described in detail with reference to the accompanying drawings. Note that the following description is directed to illustrative examples of the disclosure and not to be construed as limiting to the technology. In each of the drawings referred to in the following description, elements have different scales in order to illustrate the respective elements with sizes recognizable in the drawings. Therefore, factors including, without limitation, the number of each of the elements, the shape of each of the elements, a size of each of the elements, a dimension of each of the elements, a material of each of the elements, a ratio between the elements, relative positional relationship between the elements, and any other specific numerical value are illustrative only and not to be construed as limiting to the technology. Further, elements in the following example embodiments which are not recited in a most-generic independent claim of the disclosure are optional and may be provided on an as-needed basis. The drawings are schematic and are not intended to be drawn to scale. Throughout the specification and the drawings, elements having substantially the same function and configuration are denoted with the same reference characters to avoid redundant description, and elements not in direct relation to the technology may not be illustrated.

In the following, an airflow adjusting apparatus according to a first embodiment of the disclosure is described.

The airflow adjusting apparatus according to the first embodiment may be provided in, for example, an automobile, or a moving body. The automobile may be, for example, a passenger car of a so-called two-box or three-box vehicle shape that includes an engine room in front of a cabin.

FIG. 1 is a schematic side view of a front portion of a vehicle body of a vehicle including the airflow adjusting apparatus according to the first embodiment.

A vehicle 1 may include, without limitation, a windshield 10, a front pillar 20, a roof 30, a front door 40, a hood 50, a fender 60, a bumper face 70, a front combination lamp 80, and a flap 90.

The windshield 10 is a glass window provided in a front portion of the cabin.

The windshield 10 may have a substantially rectangular shape. The windshield 10 may be disposed in a backward tilted attitude, with an upper end 11 positioned on rear side of the vehicle relative to a lower end 12.

A side end 13 of the windshield 10 may be disposed along the front pillar 20.

The windshield 10 may include laminated glass of a quadric surface, and be curved or rounded to protrude toward front side of the vehicle.

The front pillar 20, or an A pillar, is a vehicle body structural member that extends along the side end 13 of the windshield 10.

A back end of the front pillar 20 may be disposed in adjacency to a sash provided around a front glass door in an upper portion of the front door 40.

The roof 30 is a panel that constitutes an upper surface of the cabin.

The roof 30 may extend, from the upper end 11 of the windshield 10, toward the rear side of the vehicle.

The front door 40 may be an openable and closeable door provided in a side surface of the front portion of the cabin.

The front door 40 may open or close by pivoting around an unillustrated hinge provided at a front end of the front door 40.

The hood 50 is an exterior member provided over an upper portion of the engine room. The hood 50 may be a lid-shaped body of an open and close type.

A rear edge 51 of the hood 50 may be disposed in front of the lower end 12 of the windshield 10, in spaced relation from the lower end 12 in a vehicle longitudinal direction.

The rear edge 51 may be of a curved shape protruded forward of the vehicle in plan view.

A side edge 52 of the hood 50 may be disposed in adjacency to a vehicle-widthwise inner edge of an upper surface 61 of the fender 60, with a gap in between. The gap is unavoidably provided.

The fender 60 is an exterior member of the vehicle that constitutes, for example, a side surface of the engine room.

The fender 60 may include, without limitation, the upper surface 61 and a side surface 62.

The upper surface 61 is a region adjacent to a side end of the side edge 52 of the hood 50. The upper surface 61 may be formed to trace broadly a curved plane extending vehicle-widthwise outward from a curved plane of an outer surface of the hood 50.

The side surface 62 may extend downward from the vicinity of a vehicle-widthwise outer end of the upper surface 61.

Moreover, the side surface 62 may have an arcuate notch 63 of a wheel house that houses a front wheel FW.

The bumper face 70 is a resin-made exterior member provided in a lower portion of a front end of the vehicle.

The bumper face 70 may be provided in front of the arcuate notch 63 in the fender 60.

The front combination lamp 80 may include various lighting devices housed and unitized in a common housing. Non-limiting examples of the lighting devices may include a headlamp, a position lamp, and a turn signal lamp.

The front combination lamp 80 may be disposed on lower side of the hood 50 and on upper side of the bumper face 70 at the front end of the vehicle.

The flap 90 is a plate member protruded, in front of the front wheel FW, downward from an underside of the vehicle body.

The flap 90 may laterally separate a relative wind W, or a traveling wind, flowing from forward of the vehicle toward under a floor of the vehicle, to make airflow adjustment and to suppress the relative wind W from colliding with the front wheel FW. A relative wind W refers to an airflow that moves relative to the vehicle body in accompaniment with travel of the vehicle.

The airflow adjusting apparatus of the first embodiment may include a plasma actuator 100 described below.

Figure 2:
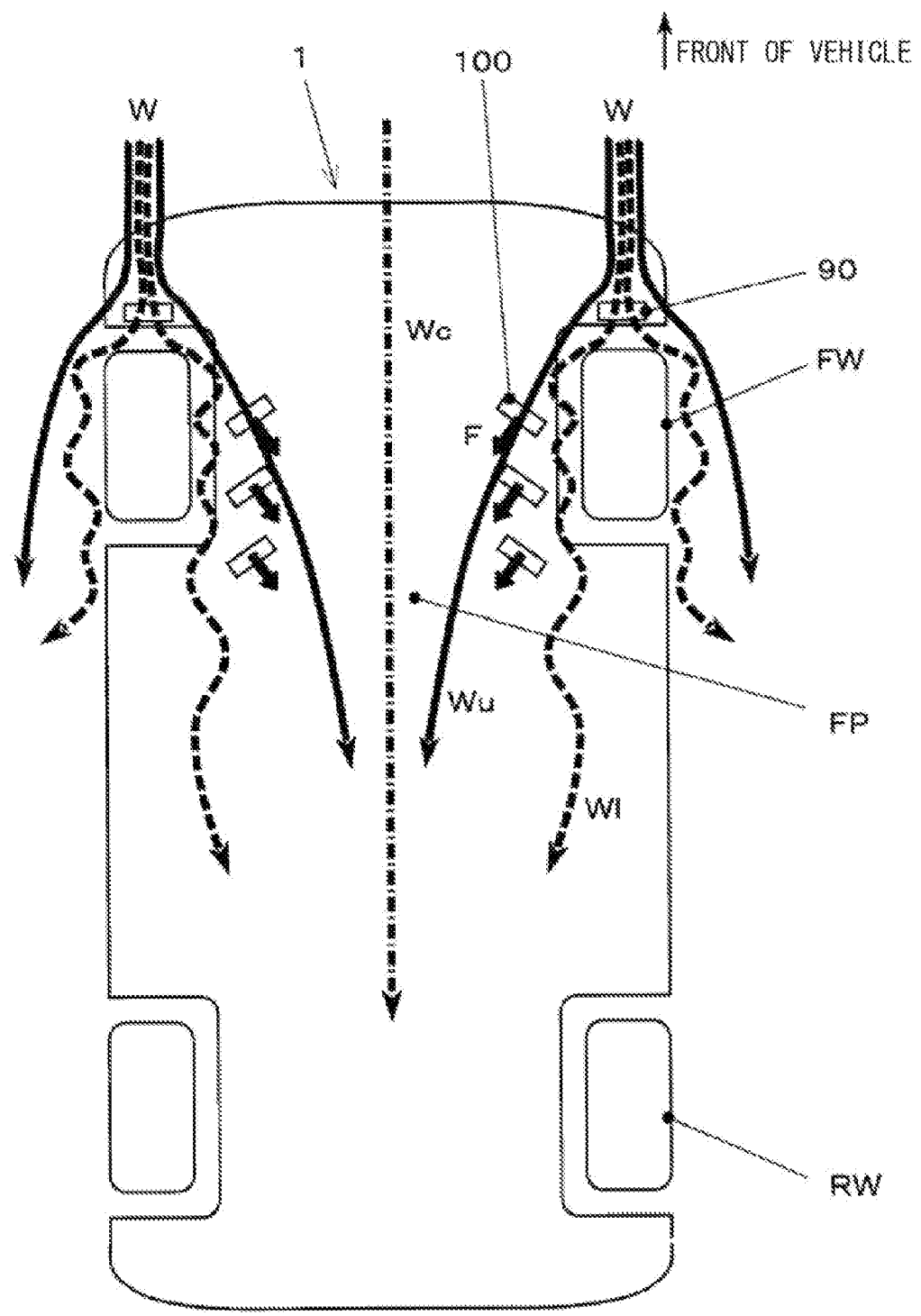
FIG. 2 schematically illustrates the vehicle according to the first embodiment, as viewed from underneath.

FIG. 2 schematically illustrates the vehicle of the first embodiment, as viewed from underneath.

As illustrated in FIG. 2, the plasma actuator 100 may include a plurality of plasma actuators 100 provided in an underneath of the vehicle body of the vehicle 1.

The plasma actuator 100 may generate an airflow F, with electric power supplied from a power supply device. In one embodiment of the disclosure, the plasma actuator 100 may serve as an "airflow generator".

For example, the plasma actuator 100 may be attached to whatever is exposed downward of the vehicle, out of a main body of the vehicle body (e.g., a front side frame and a floor panel) or a component to be attached to the main body of the vehicle body (e.g., an undercover and a sub-frame).

The plasma actuator 100 is provided, in an underneath of the vehicle 1, vehicle-widthwise inwardly from the left and right front wheels FW. The plurality of the plasma actuators 100 may be disposed in line along the vehicle longitudinal direction. For example, in the case of FIG. 2, the three plasma actuators 100 may be disposed in line along the vehicle longitudinal direction.

The plasma actuator 100 may be disposed in lateral symmetry.

Each of the plasma actuators 100 is configured to generate the airflow F backward of the vehicle 1, and vehicle-widthwise inward, in a bottom view of the vehicle 1. The airflow F moves obliquely relative to the vehicle longitudinal direction and to a vehicle widthwise direction.

A main flow component of the airflow F may move along a lower surface of a floor panel FP that constitutes the underside of the vehicle 1. The main flow component of the airflow F has a maximum speed in the airflow F.

Moreover, some or all of the plurality of the plasma actuators 100 may be disposed on the rear side of the vehicle relative to an axle of the front wheel FW.

In the example illustrated in FIG. 2, the plasma actuator 100 in a first row from the front side of the vehicle may be positioned, in the vehicle longitudinal direction, immediately before the axle of the front wheel FW. The axle is a central axis of an unillustrated hub bearing. The plasma actuators 100 in a second row and a third row may be disposed on the rear side of the vehicle relative to the axle.

Figure 3:
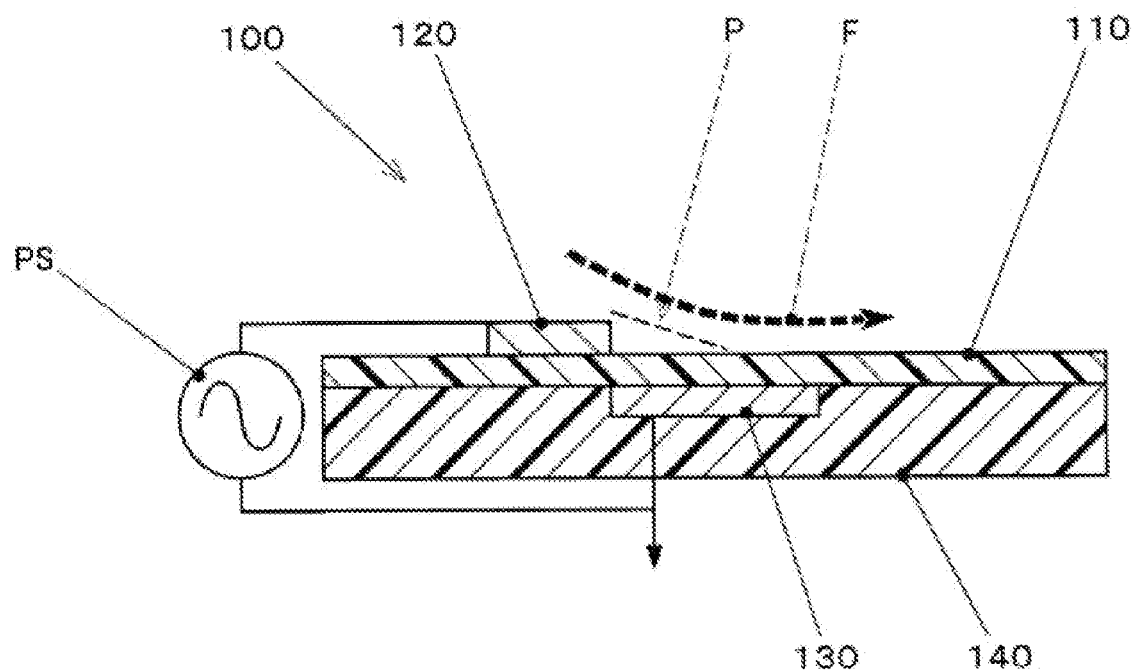
FIG. 3 is a schematic cross-sectional view of a bipolar plasma actuator to be provided in the airflow adjusting apparatus according to the first embodiment.

FIG. 3 is a schematic cross-sectional view of a bipolar plasma actuator to be provided in the airflow adjusting apparatus of the first embodiment.

The bipolar plasma actuator 100 may include, without limitation, a dielectric 110, an upper electrode 120, a lower electrode 130, and an insulator 140.

The dielectric 110 may be a sheet-shaped member including, for example, a fluorocarbon resin such as polytetrafluoroethylene.

The upper electrode 120 and the lower electrode 130 may each include an electrically-conductive tape including a thin metal film of, for example, copper.

The upper electrode 120 may be attached to outer surface side of the dielectric 110. The outer surface side of the dielectric 110 refers to side exposed to the outside when the plasma actuator 100 is attached to, for example, the vehicle body.

The lower electrode 130 may be attached to inner surface side of the dielectric 110 that is opposite to the outer surface side of the dielectric 110.

The upper electrode 120 and the lower electrode 130 may be offset in an in-plane direction of the dielectric 110.

The insulator 140 may be a sheet-shaped member that serves as a base of the plasma actuator 100. The insulator 140 may be provided, on the inner surface side of the dielectric 110, to cover the lower electrode 130.

Allowing a power supply PS to apply an alternating voltage having a predetermined waveform to the upper electrode 120 and the lower electrode 130 of the plasma actuator 100 causes generation of a plasma discharge P between the electrodes.

It is necessary for the applied voltage to be high enough to cause electrical breakdown and generate the plasma discharge P. For example, the applied voltage may range from about 1 kV to about 10 kV.

A frequency of the applied voltage may range, for example, from about 1 kHz to about 10 kHz.

At this occasion, the air on the outer surface side of the plasma actuator 100 is drawn to the plasma discharge P, causing generation of the airflow F in a wall jet.

Moreover, the plasma actuator 100 is configured to reverse a direction of the airflow F, by controlling the waveform of the alternating voltage to be applied.

The airflow adjusting apparatus of the first embodiment may include a control system described below, to supply driving electric power to the plasma actuator 100 described above, allowing the plasma actuator 100 to generate the airflow F for airflow adjustment of relative winds and air flows moving between the underneath of the vehicle body and the road surface.

Figure 4:
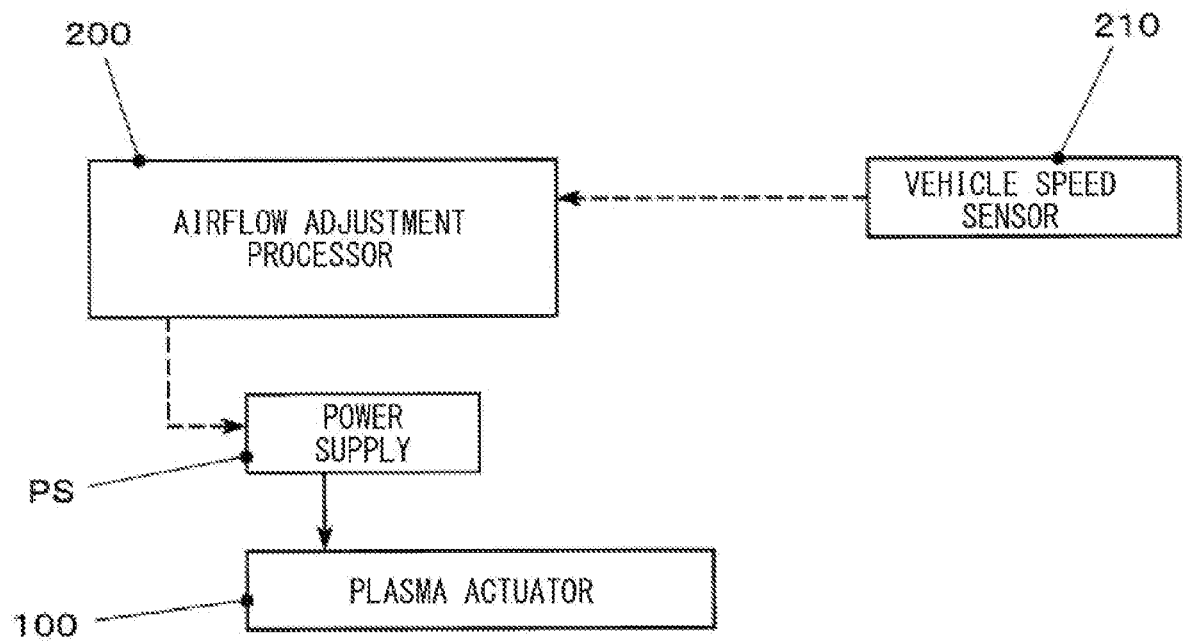
FIG. 4 is a block diagram illustrating a configuration of a control system of the plasma actuator in the airflow adjusting apparatus according to the first embodiment.

FIG. 4 is a block diagram illustrating a configuration of the control system of the plasma actuator in the airflow adjusting apparatus of the first embodiment.

The control system may include, without limitation, an airflow adjustment processor 200 and a vehicle speed sensor 210.

The airflow adjustment processor 200 may control the power supply PS to control whether to operate or stop the plasma actuator 100. In operating the plasma actuator 100, the airflow adjustment processor 200 may control strength of the airflow F, e.g., an amount of flow and a flow rate.

The airflow adjustment processor 200 may include, for example, a microcomputer including, without limitation, an information processor such as a CPU (Central Processing Unit), a storage such as a RAM (Random Access Memory) and/or a ROM (Read Only Memory), input and output interfaces, and a bus that couples them together.

The vehicle speed sensor 210 may detect a traveling speed of the vehicle 1, or a vehicle speed.

The vehicle speed sensor 210 may be provided in a hub bearing housing that rotatably holds the front wheel FW or a rear wheel RW. The vehicle speed sensor 210 is configured to output a vehicle speed signal corresponding to a rotational speed of the wheel.

The airflow adjustment processor 200 may operate the plasma actuator 100 to generate the airflow F in a case where the vehicle speed detected by the vehicle speed sensor 210 is equal to or higher than a predetermined threshold. The airflow F moves backward of the vehicle, and vehicle-widthwise inward. That is, the airflow moves obliquely.

The airflow F moves substantially horizontally along a floor surface of the vehicle 1, that is, along the floor panel FP.

Moreover, the strength of the airflow F may be set to increase in accordance with an increase in the vehicle speed detected by the vehicle speed sensor 210.

In the following, workings and effects of the first embodiment are described.

As denoted by bold arrows in FIGS. 1 and 2, on forward travel of the vehicle 1, a relative wind, i.e., a so-called traveling wind, occurs. The relative wind moves from the front side of the vehicle to the rear side of the vehicle relative to the vehicle body.

The relative wind W moves into the vicinity of the front wheel FW under the floor of the vehicle body, i.e., between the underneath of the vehicle body and the road surface. A relatively upper component within the relative wind W collides with the flap 90, and separates itself laterally, i.e., in the vehicle widthwise direction, into air flows Wu. The air flows Wu move backward of the vehicle, passing through the right and left sides of the front wheel FW.

In the meanwhile, a component within the traveling wind W at a lower level than the air flows Wu, i.e., closer to the road surface, collides directly with a lower portion of the front wheel FW, and separates itself laterally into air flows Wl. The air flows Wl move backward of the vehicle, passing through the right and left sides of the front wheel FW.

The lower-level air flows Wl collide with a tire and a wheel of the rotating front wheel FW, causing relatively greater turbulence, or vortex, and a lower flow rate than the upper-level air flows Wu.

In a case where the upper-level air flow Wu joins the lower-level air flow Wl, the flow rate of the air flow Wu is impaired, and turbulence occurs. This results in aggravation in air resistance, aerodynamic noise, and aerodynamic vibration of the vehicle 1.

In contrast, in the first embodiment, the plasma actuator 100 generates, or ejects, the airflow F. This suppresses whichever component of the upper-level air flows Wu moves vehicle-widthwise inward of the front wheel FW, from being entrained in the lower-level air flow Wl. Hence, it is possible to deflect the relevant component vehicle-widthwise centrally, while accelerating the relevant component.

Thus, the air flow Wu guided vehicle-widthwise centrally joins an air flow Wc moving vehicle-widthwise centrally. The air flow Wc is under small influence of the collision with the front wheel FW and has a relatively high flow rate. Thus, the air flow Wu is quickly discharged backward of the vehicle body.

As described, in the first embodiment, it is possible to produce the following effects.
(1) At the upper level in the region between the underneath of the vehicle body and the road surface, the air flow Wu having collided with the flap 90 and separated itself vehicle-widthwise inward has relatively small turbulence and a high flow rate. Allowing the plasma actuator 100 to generate the airflow F to blow away the air flow Wu makes it possible to join the air flow Wu to the air flow Wc that moves centrally at an even higher flow rate without being affected by the collision with the front wheel FW. Accordingly, it is possible to accelerate the air flow Wu and discharge the air flow Wu backward of the vehicle.

Hence, it is possible to suppress the air flow Wu having collided with the flap 90 from being entrained in the lower-level air flow Wl having directly collided with the front wheel FW and including a slow, turbulent flow. This leads to improvement in air resistance, aerodynamic noise, and aerodynamic vibration of the vehicle 1.

(2) The airflow F generated by the plasma actuator 100 moves along the lower surface of the floor panel FP. This makes it possible to suppress more reliably the air flow Wu from being entrained in the air flow Wl that slowly moves underneath and includes the slow, turbulent flow.

(3) The plurality of the plasma actuators 100 may be disposed in a distributed manner in the vehicle longitudinal direction. This makes it possible to deflect reliably the air flow Wu that collides with the flap 90 to separate itself vehicle-widthwise inward of the front wheel FW and move while diffusing itself. Hence, it is possible to ensure the effects described above.

(4) Some or all of the plurality of the plasma actuators 100 may be disposed on the rear side of the axle of the front wheel FW. This makes it possible to deflect effectively, centrally of the vehicle, the air flow Wu that moves on the rear side of the front wheel FW while diffusing itself. Hence, it is possible to obtain reliably the effects described above.

(5) The plasma actuator 100 may serve as an "airflow generator" in one embodiment of the disclosure. Thanks to the simple configuration of the plasma actuator 100 devoid of movable components, it is possible to generate the airflow F with high responsiveness.

Second Embodiment

Description now moves on to an airflow adjusting apparatus according to a second embodiment of the disclosure.

The following description is given mainly of differences from the forgoing first embodiment. Constituent elements common to those of the forgoing first embodiment are denoted by the same reference characters, and description thereof is omitted.

Figure 5:
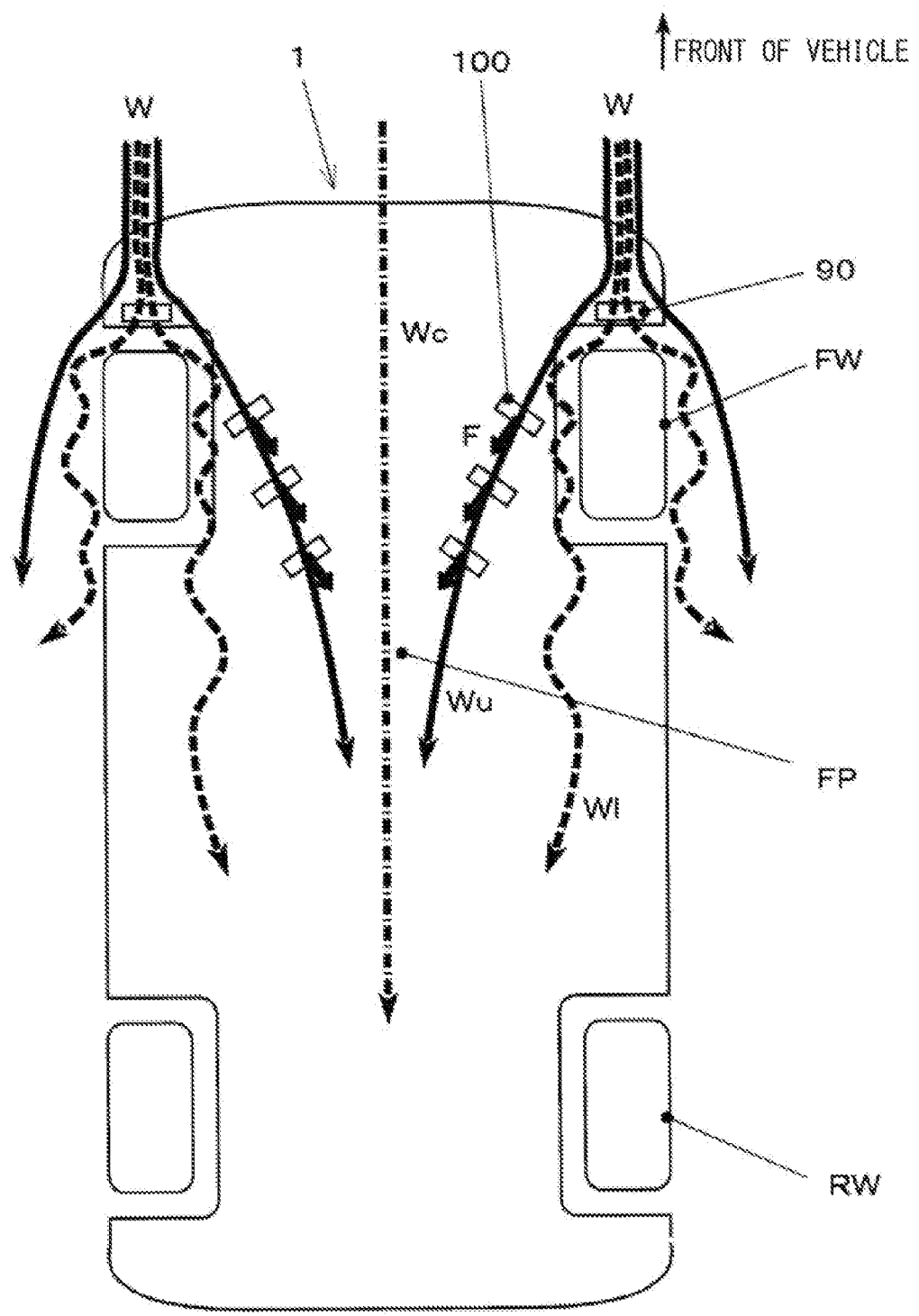
FIG. 5 schematically illustrates a vehicle including an airflow adjusting apparatus according to a second embodiment of the disclosure, as viewed from underneath.

FIG. 5 schematically illustrates a vehicle according to the second embodiment, as viewed from underneath.

An airflow adjusting apparatus of the second embodiment may include the plurality of the plasma actuators 100 disposed in line in the vehicle longitudinal direction. The plurality of the plasma actuators 100 may be disposed in line along a direction inclined to the vehicle longitudinal direction, allowing the plurality of the plasma actuators 100 to be positioned vehicle-widthwise inwardly from one another, sequentially from the front side of the vehicle to the rear side of the vehicle.

As described, in the second embodiment, in addition to similar effects to the effects of the forgoing first embodiment, the following effect is produced. The plasma actuators 100 disposed on the front side of the vehicle generate the airflow F, and thereby guide an air flow. The air flow thus guided is further accelerated by the plasma actuators 100 disposed behind the plasma actuators 100 disposed on the front side of the vehicle. Hence, it is possible to further promote the effects described above.

MODIFICATION EXAMPLES

Although some embodiments of the technology are described above by way of example with reference to the accompanying drawings, the technology is by no means limited to the embodiments described above. It should be appreciated that modifications and alterations may be made by persons skilled in the art without departing from the scope as defined by the appended claims.

(1) The configurations of the vehicle and the airflow adjusting apparatus are not limited to the forgoing embodiments, but may be changed as appropriate.

For example, a vehicle type and a vehicle model of the vehicle are not limited to the forgoing embodiments, but may be changed as appropriate.

(2) The arrangement and the number of the plasma actuators in the forgoing embodiments, or the "airflow generators" in one embodiment of the disclosure, are merely exemplary, and may be changed as appropriate.

(3) In the forgoing embodiments, the airflow adjusting apparatus is provided on the front side of the vehicle on which the front wheels are provided, but the airflow adjusting apparatus may be provided on the rear side of the vehicle on which the rear wheels are provided.

(4) In the forgoing embodiments, the plasma actuator may serve as the "airflow generator" in one embodiment of the disclosure, but the airflow generation may be carried out by other methods than the use of the plasma actuator.

The configuration of the plasma actuator is not limited to those of the forgoing embodiments, but may be changed as appropriate.

(5) In the forgoing embodiments, the alternating voltage is applied between the electrodes of the plasma actuator. However, in an alternative configuration, a DC voltage may be applied. For example, a DC voltage may be pulsed at a predetermined frequency. In the case with the DC voltage application, polarity may be switchable, to control a direction of the generation of the airflow.

As described, according to the aspects of the technology, it is possible to provide an airflow adjusting apparatus that makes it possible to adjust appropriately airflows between an underneath of a vehicle body and a road surface.

The airflow adjustment processor 200 illustrated in FIG. 4 is implementable by circuitry including at least one semiconductor integrated circuit such as at least one processor (e.g., a central processing unit (CPU)), at least one application specific integrated circuit (ASIC), and/or at least one field programmable gate array (FPGA). At least one processor is configurable, by reading instructions from at least one machine readable non-transitory tangible medium, to perform all or a part of functions of the airflow adjustment processor 200. Such a medium may take many forms, including, but not limited to, any type of magnetic medium such as a hard disk, any type of optical medium such as a CD and a DVD, any type of semiconductor memory (i.e., semiconductor circuit) such as a volatile memory and a non-volatile memory. The volatile memory may include a DRAM and a SRAM, and the nonvolatile memory may include a ROM and a NVRAM. The ASIC is an integrated circuit (IC) customized to perform, and the FPGA is an integrated circuit designed to be configured after manufacturing in order to perform, all or a part of the functions of the airflow adjustment processor 200 illustrated in FIG. 4.

It should be appreciated that modifications and alterations may be made by persons skilled in the art without departing from the scope as defined by the appended claims. The use of the terms first, second, etc. does not denote any order or importance, but rather the terms first, second, etc. are used to distinguish one element from another. The technology is intended to include such modifications and alterations in so far as they fall within the scope of the appended claims or the equivalents thereof.

The invention claimed is:

1. An airflow adjusting apparatus to be provided in a vehicle, the vehicle including a front wheel disposed to be partly protruded downward from a vehicle body of the vehicle, the airflow adjusting apparatus comprising:
a flap protruded, in front of the front wheel and aligned with the front wheel, downward from the vehicle body;
a first plasma actuator provided in an underneath of the vehicle body and vehicle-widthwise inwardly from the front wheel, and configured to generate a first airflow along an underside of the vehicle body, a main flow component of the generated first air flow being directed from the first plasma actuator toward vehicle-widthwise inward, and backward of the vehicle, the main flow component of the generated first air flow having a maximum speed in the generated first airflow; and
a second plasma actuator provided in the underneath of the vehicle body and vehicle-widthwise inwardly from the front wheel, and configured to generate a second airflow along the underside of the vehicle body, a main flow component of the generated second air flow being directed from the second plasma actuator toward vehicle-widthwise inward, and backward of the vehicle, the main flow component of the generated second air flow having a maximum speed in the generated second airflow,
wherein a center of the first plasma actuator is provided backward from a front edge of the front wheel and forward from a rear edge of the front wheel, and
wherein a center of the second plasma actuator is provided backward from the center of the first plasma actuator and forward from the rear edge of the front wheel.

2. The airflow adjusting apparatus according to claim 1, wherein the first plasma actuator and the second plasma actuator are disposed in a distributed manner in the vehicle longitudinal direction.

3. The airflow adjusting apparatus according to claim 2, wherein the center of the second plasma actuator is disposed on rear side of the vehicle relative to an axle of the front wheel.

4. The airflow adjusting apparatus according to claim 1, wherein the center of the second plasma actuator is disposed on rear side of the vehicle relative to an axle of the front wheel.

5. The airflow adjusting apparatus according to claim 1, wherein a reference line perpendicular to an axis of the front wheel intersects a middle point of the front wheel and the flap.

6. The airflow adjusting apparatus according to claim 1, wherein the flap is provided frontward with respect to the first plasma actuator in a vehicle longitudinal direction.

7. The airflow adjusting apparatus according to claim 1, wherein the first plasma actuator and the second plasma actuator are provided vehicle-widthwise inwardly from the flap.

8. The airflow adjusting apparatus according to claim 1, wherein the flap is positioned directly in front of the front wheel.

9. The airflow adjusting apparatus according to claim 1, wherein the flap is positioned in front of the front wheel to augment the airflow received by the front wheel.

10. The airflow adjusting apparatus according to claim 1, wherein the main flow component of the generated first air flow and the main flow component of the generated second air flow are substantially parallel.

11. The airflow adjusting apparatus according to claim 1, wherein the center of the second plasma actuator is provided vehicle-widthwise inward from the center of the first plasma actuator.

12. The airflow adjusting apparatus according to claim 1, further comprising an airflow adjustment processor configured to control strength of the first and second airflows.

13. The airflow adjusting apparatus according to claim 12, wherein the airflow adjustment processor is configured to operate the first and second plasma actuators to generate the first and second airflows in a case where a vehicle speed of the vehicle is equal to or higher than a predetermined threshold.

14. The airflow adjusting apparatus according to claim 12, wherein the airflow adjustment processor is configured to operate the first and second plasma actuators such that the strength of the first and second airflows increase in accordance with an increase in a vehicle speed of the vehicle.

15. An airflow adjusting apparatus to be provided in a vehicle, the vehicle including a front wheel disposed to be partly protruded downward from a vehicle body of the vehicle, the airflow adjusting apparatus comprising:
a flap protruded, in front of the front wheel, downward from the vehicle body;
a first plasma actuator provided in an underneath of the vehicle body and vehicle-widthwise inwardly from the front wheel, and configured to generate a first airflow along an underside of the vehicle body, a main flow component of the generated first air flow being directed from the first plasma actuator toward vehicle-widthwise inward, and backward of the vehicle, the main flow component of the generated first air flow having a maximum speed in the generated first airflow; and
a second plasma actuator provided in the underneath of the vehicle body and vehicle-widthwise inwardly from the front wheel, and configured to generate a second airflow along the underside of the vehicle body, a main flow component of the generated second air flow being directed from the second plasma actuator toward vehicle-widthwise inward, and backward of the vehicle, the main flow component of the generated second air flow having a maximum speed in the generated second airflow,
wherein a center of the first plasma actuator is provided backward from a front edge of the front wheel and forward from a rear edge of the front wheel, and
wherein a center of the second plasma actuator is provided backward from the center of the first plasma actuator and forward from the rear edge of the front wheel.

16. An airflow adjusting apparatus to be provided in a vehicle, the vehicle including a front wheel disposed to be partly protruded downward from a vehicle body of the vehicle, the airflow adjusting apparatus comprising:
a flap protruded, in front of the front wheel and between a first position and a second position in the vehicle-widthwise direction, downward from the vehicle body, the first position being vehicle-widthwise outward from an inner end of a wheel house that houses the front wheel, and the second position being located between the first position and the center of the vehicle body; and
a plasma actuator provided on a third position in an underneath of the vehicle body and configured to generate an airflow along an underside of the vehicle body, a main flow component of the generated air flow being directed from the first plasma actuator toward vehicle-widthwise inward, and backward of the vehicle, the main flow component of the generated air flow having a maximum speed in the generated first airflow the third position being located between the second position and the center of the vehicle body in the vehicle-widthwise direction and being located between a front end of the wheel house and a rear end of the wheel house in a vehicle longitudinal direction.

17. The airflow adjusting apparatus according to claim 16, wherein the first position and the second position overlap the front wheel when the vehicle is viewed along the vehicle longitudinal direction.

18. The airflow adjusting apparatus according to claim 16, further comprising an airflow adjustment processor configured to control strength of the airflow.

19. The airflow adjusting apparatus according to claim 18, wherein the airflow adjustment processor is configured to operate the plasma actuator to generate the airflow in a case where a vehicle speed of the vehicle is equal to or higher than a predetermined threshold.

20. The airflow adjusting apparatus according to claim 18, wherein the airflow adjustment processor is configured to operate the plasma actuator such that the strength of the airflow increase in accordance with an increase in a vehicle speed of the vehicle.

* * * * *